Dec. 9, 1958
M. SLIPKA
2,863,255
INSULATED MINNOW PAIL
Filed March 16, 1956
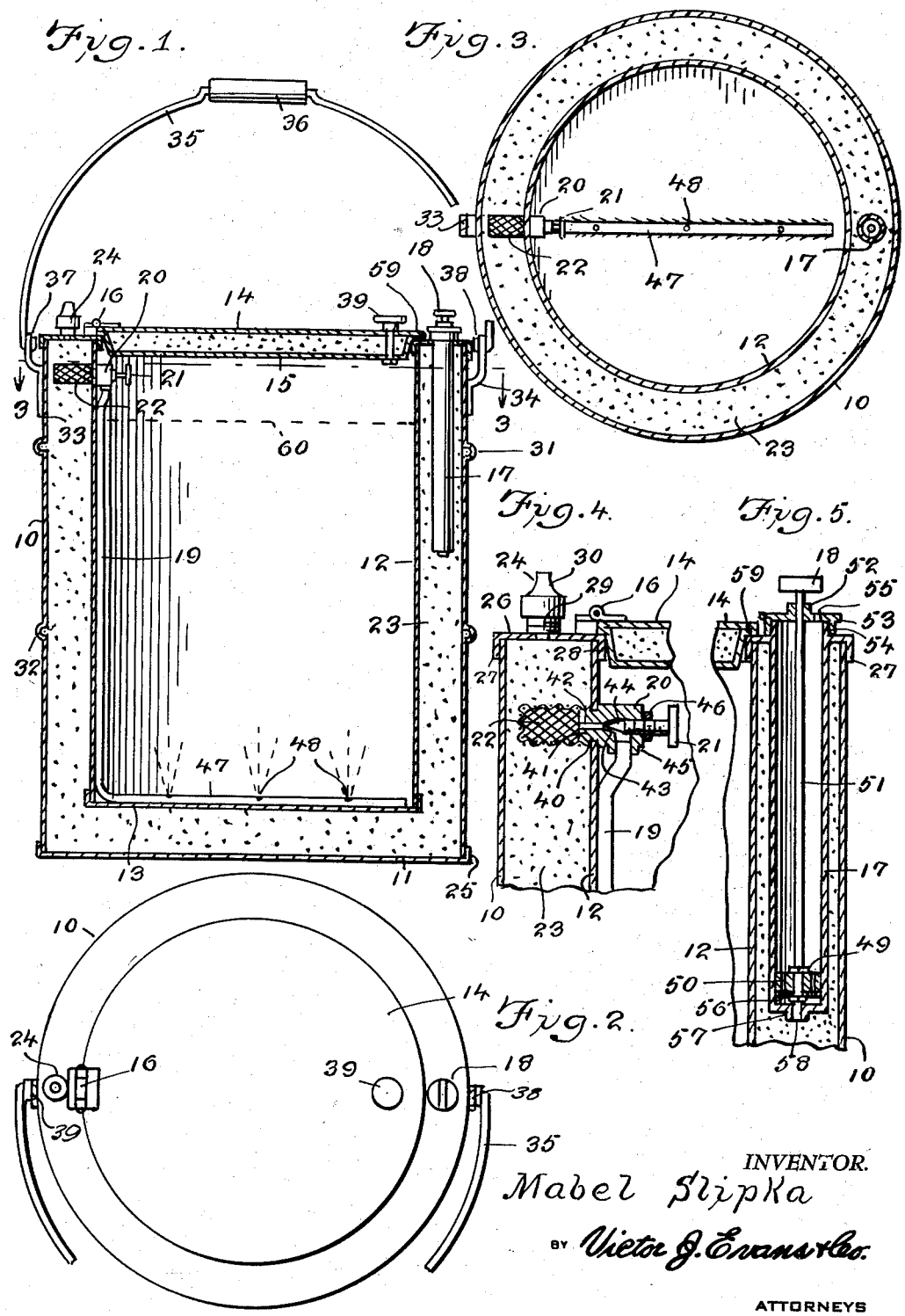
INVENTOR.
Mabel Slipka
BY Victor J. Evans & Co.
ATTORNEYS

United States Patent Office 2,863,255
Patented Dec. 9, 1958

2,863,255

INSULATED MINNOW PAIL

Mabel Slipka, New Richmond, Wis.

Application March 16, 1956, Serial No. 572,105

1 Claim. (Cl. 43—57)

This invention relates to minnow pails of the aerated type, and in particular a minnow pail having a double wall with insulation, such as mineral wool for lessening the effect of the temperature of the outside air on the air in the insulated air chamber and consequently keeping the water in an inner chamber relatively cool and with the area between the walls and in which the insulation is positioned providing an air chamber to which air is supplied with a hand pump incorporated in the minnow pail and from which air is injected into water of the inner chamber of the pail through a needle valve whereby the amount of air supplied to the water is adapted to be controlled.

The purpose of this invention is to provide means for supplying oxygen, such as the oxygen in air to minnows in water in a minnow pail whereby minnows may be retained in the pail for an indefinite period and wherein the minnows are adapted to be transported or shipped from one point to another without being removed from the pail.

Various types of minnow pails have been provided and some of the pails are provided with aerating means, however, in order to insure the life of minnows in a minnow pail, particularly over long periods of time, it is not only necessary to supply oxygen by means of air to water in a pail, but it is also necessary to insulate the pail to prevent overheating or freezing. With this thought in mind this invention contemplates a minnow pail having insulation between double walls thereof with the compartment in which the insulation is provided forming a storage chamber for air whereby the chamber is adapted to be filled with air under pressure with a small pump and wherein the amount of air passing into the interior of the bucket is adapted to be controlled by a manually actuated needle valve.

The object of this invention is, to provide means for maintaining a constant supply of oxygen to minnows in a minnow pail and also means for controlling the temperature of the pail.

Another object of the invention is to provide a minnow pail which is both insulated and aerated and in which minnows may readily be removed from the pail.

Another important object of the invention is to provide an aerated insulated minnow pail in which the pail is adapted to be readily cleaned.

A further object of the invention is to provide an aerated insulated minnow pail having means for regulating the amount of air released into the water of the pail, and in which the pail is of a simple and economical construction.

With these and other objects and advantages in view the invention embodies an improved minnow pail having an outer shell upon which a handle is pivotally mounted, an inner container, the walls of which are spaced from the outer shell, a double wall cover hinged on the upper end of the pail for closing the pail, insulation positioned between the walls of the container and outer shell, a hand pump mounted on the pail and extended into the area between the walls of the container and outer shell, a vent positioned to release air from the area between the container and outer shell to control the pressure thereof and an air supply tube having a needle valve therein extended from the area between the container and outer shell into the lower end of the container for supplying oxygen to water in the pail.

Other features and advantages of the invention will appear from the following description taken in connection with the drawing, wherein:

Figure 1 is a vertical section through the improved minnow pail showing the device with the cover in the closed position and with a bale providing a handle extended upwardly therefrom.

Figure 2 is a plan view of the pail with part of the handle, which is moved to a horizontal position, broken away.

Figure 3 is a sectional plan through the upper part of the improved minnow pail taken on line 3—3 of Fig. 1 showing, in particular, the controlled air supply tube positioned on the inner surface of the lower end of the inner container of the pail.

Figure 4 is a cross section through the upper portion of one side of the pail with the parts shown on an enlarged scale and with parts broken away showing the connection of the aerating tube and control valve therefor in the upper corner of the pail.

Figure 5 is a cross section also through the upper portion of the pail with the parts shown on an enlarged scale and with parts broken away, illustrating the arrangement of the hand pump mounted in the upper end of the pail.

Referring now to the drawing wherein like reference characters denote corresponding parts the improved aerated and insulated minnow pail of this invention includes an outer shell having a cylindrical wall 10 and a bottom 11, an inner container also having a cylindrical wall, as indicated by the numeral 12 with a bottom 13, a cover having an upper panel 14 and a lower panel 15, pivotally connected to an annular ring 26 by a hinge 16, a pump having an outer casing 17 and adapted to be manually actuated with a knob 18, an air inlet tube 19 having a control valve 20 at one end, the valve 20 having a handle 21 for actuating a needle valve therein and the end of the valve being extended through the wall 12 of the inner container and into a strainer 22 positioned in an area 23 between the container and shell, and a vent or relief valve 24 also mounted to exceed into the open area 23 between the container and outer shell.

The bottom 11 of the outer shell 10 is secured to the lower edge of the shell with a flange 25 and may be secured in position by braising, welding, or the like and the upper, or open end of the shell is provided with an anular ring 26, channel-shape in cross section having annular flanges 27 and 28 at the edges and, as illustrated in Fig. 4 flanges 27 and 28 are positioned over upper edges of the wall of the outer shell 10 and over the upper edge of the wall 12 of the inner container whereby the area between the inner container and outer shell is substantially sealed.

The cover 26 is provided with a threaded opening and threaded nipple 29 upon which a cap 30 having an orifice in the upper end, is threaded therein providing a relief valve 24 to prevent excessive pressures in the area 23 and also to provide a vent to the atmosphere.

The cylindrical wall of the outer shell is also provided with annular ribs 31 and 32 for reinforcing the wall. The upper portion of the wall is also provided with brackets 33 and 34 to which a bale 35 having a handle 36 at the center is pivotally connected with fasteners 37 and 38. The hinge door is also provided with a handle 39 that is secured to the cover, as shown in Fig. 1, or by other suitable means.

The valve 20 is positioned in an opening 40 in the wall of the inner container 12 with a threaded nipple 41 extended through the wall and, as illustrated in Fig. 4 the wire screen 22 is mounted on the extended end of the nipple. The valve is provided with a bore 42 in which a seat 43 of the valve body is positioned and a needle or point 44 that is adapted to coact with the seat 43 to regulate the opening through the valve body with the valve body also provided with a boss 45 from which the tube 19 extends and a lock nut 46 which is threaded on the valve stem and which is adapted to secure the valve in operative positions. The tube 19 extends downwardly from the valve to the bottom 13 of the inner container and a lower end 47, which extends across the upper surface of the bottom 13 is provided with outlet openings 48 through which air is discharged into water in the inner container.

The pump 17, which is provided with a tubular casing, includes a piston 49 having openings 50 therethrough, which is positioned on the lower end of a piston rod 51, on the upper end of which a knob 18 is mounted and, as illustrated in Fig. 5 the piston rod is slidably mounted in a boss 52 on a cap 53 which is threaded on a nipple 54 on the upper end of the tube of the pump. The cap 53 is provided with an opening 55 through which air is drawn by the piston as it is moved downwardly in the compression stroke and the lower side of the piston 49 is provided with a flap valve 56 which covers lower ends of the openings 50 as the piston moves downwardly and which moves outwardly to open the openings to permit air to pass through the piston as the piston moves upwardly. The lower end of the pump casing is provided with a boss 57 through which an opening 58 extends.

The area 23 between the inner container 12 and the outer shell 10 is provided with suitable insulating material such as fiber glass or the like.

The cover is provided with an annular flange 59 that rests upon the inner edge of the ring 26 whereby the cover is adapted to be actuated to provide access to minnows in the bucket. The cover is retained in the closed position by gravity.

Operation

With the parts designed and assembled as illustrated and described the inner container may be filled with water, substantially to the line 60 and with minnows in the water the cover is closed preventing escape of the minnows. At regular intervals the pump 17 is actuated by the knob 18 whereby air is pumped into the area 23 between the inner container and outer shell and by adjusting the position of the valve element 44 air is admitted through the tube 19 and openings 48 into the water, supplying oxygen to the minnows. A supply of air may be retained in the area 23 and with air under pressure and with the needle valve set to admit small quantities of air into the water, the device may be adapted to supply air and oxygen to the water for relatively long periods of time.

The container, with minnows therein, may readily be shipped from one point to another and may be carried with other fishing tackle to a boat or to a suitable point for fishing.

The insulation between the walls of the container, being mineral wool, lessens the effect of the outside temperature on the temperature of the air within the air chamber. Thus the air in the air chamber is cooler than the hot air surrounding the container, resulting in cooler air entering the inner or water chamber thereby reducing the temperature of the water and, in combination with the insulated wall maintaining the water at a comparatively low temperature.

It will be understood that modifications, within the scope of the appended claim, may be made in the design and arrangement of the parts without departing from the spirit of the invention.

What is claimed is:

A minnow pail comprising an outer shell having a cylindrical wall provided with relatively spaced annular reinforcing ribs and with a bottom providing a closure for the lower end, an inner container also having a cylindrical wall with a bottom providing a closure for the lower end, the wall of the inner container and also the bottom thereof being spaced from corresponding parts of the outer shell, a cover having an upper panel and a lower panel providing space therebetween in which insulation is positioned, an annular ring connecting upper edges of the cylindrical walls of the inner container and outer shell, said cover being hinged to said annular ring, a manually actuated pump mounted on the annular ring and extended into an area between the inner container and outer shell, a relief valve also mounted on the annular ring to vent the area between the outer shell and the inner container, a needle valve extended through an opening in the wall of the inner container into a strainer positioned between the outer shell and inner container and adapted to admit air from the area between the inner container and outer shell into the inner container, a perforated tube extended from said needle valve downwardly within the inner container in contact with the inner surface thereof and across the bottom thereof in contact therewith to terminate in the lower part of the inner container, insulation positioned between the inner container and outer shell, and a bale providing a handle pivotally mounted in brackets secured to the upper end of the outer shell.

References Cited in the file of this patent

UNITED STATES PATENTS

| | | |
|---|---|---|
| 514,476 | Kersey | Feb. 13, 1894 |
| 867,463 | Yingling | Oct. 1, 1907 |
| 1,012,089 | MacKay | Dec. 19, 1911 |
| 1,568,730 | Gleason | Jan. 5, 1926 |
| 1,731,921 | Coleman et al. | Oct. 15, 1929 |
| 2,159,718 | Spiner et al. | May 23, 1939 |
| 2,736,983 | Hostetter | Mar. 6, 1956 |
| 2,767,509 | Breithaupt | Oct. 23, 1956 |